(12) United States Patent
Lingala et al.

(10) Patent No.: US 12,400,454 B2
(45) Date of Patent: Aug. 26, 2025

(54) METHOD AND SYSTEM TO ANALYZE SPACES FOR CLEANING BASED ON THE PRESENCE OF AN INDIVIDUAL

(71) Applicant: CARRIER CORPORATION, Palm Beach Gardens, FL (US)

(72) Inventors: Ramesh Lingala, Telangana (IN); Ganesh Kumar Malthurkar, Telangana (IN); Vasudevan Raghavan, Telangana (IN); Yuri Novozhenets, Pittsford, NY (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 157 days.

(21) Appl. No.: 18/183,470

(22) Filed: Mar. 14, 2023

(65) Prior Publication Data

US 2023/0298354 A1    Sep. 21, 2023

Related U.S. Application Data

(60) Provisional application No. 63/320,376, filed on Mar. 16, 2022.

(51) Int. Cl.
 *G06V 20/52* (2022.01)
 *G01S 5/02* (2010.01)
 (Continued)

(52) U.S. Cl.
 CPC .......... *G06V 20/52* (2022.01); *G01S 5/0269* (2020.05); *G06T 7/70* (2017.01); *G06V 20/20* (2022.01);
 (Continued)

(58) Field of Classification Search
 CPC ....... G06V 20/52; G06V 20/20; G01S 5/0269
 See application file for complete search history.

(56) References Cited

U.S. PATENT DOCUMENTS 8,786,429 B2    7/2014    Li et al.
8,990,098 B2    3/2015    Swart et al.
(Continued)

FOREIGN PATENT DOCUMENTS

EP    3621050 A1    3/2020
WO    2021194944 A1    9/2021

OTHER PUBLICATIONS

Author Unknown, "Janitorial Software to Successfully Manage Cleanign Operations"; Janitorial Manager; Double A Solutions LLC; 2023; 29 Pages. https://www.janitorialmanager.com/.
(Continued)

*Primary Examiner* — Yi Yang
(74) *Attorney, Agent, or Firm* — CANTOR COLBURN LLP

(57) ABSTRACT

A method for monitoring and controlling a cleanliness of a space including: monitoring a distance of one or more individuals relative to an object within the space using a space monitoring system; determining when the distance is less than a selected distance; determining a number of the one or more individuals within the selected distance of object; determining a duration that the one or more individuals are within the selected distance of the object; and determining that the object requires a cleaning when at least one of: the number of the one or more individuals within the selected distance of object exceeds a threshold number, or the duration that the one or more individuals are within the selected distance of the object exceeds a threshold time.

17 Claims, 2 Drawing Sheets

Figure 1:
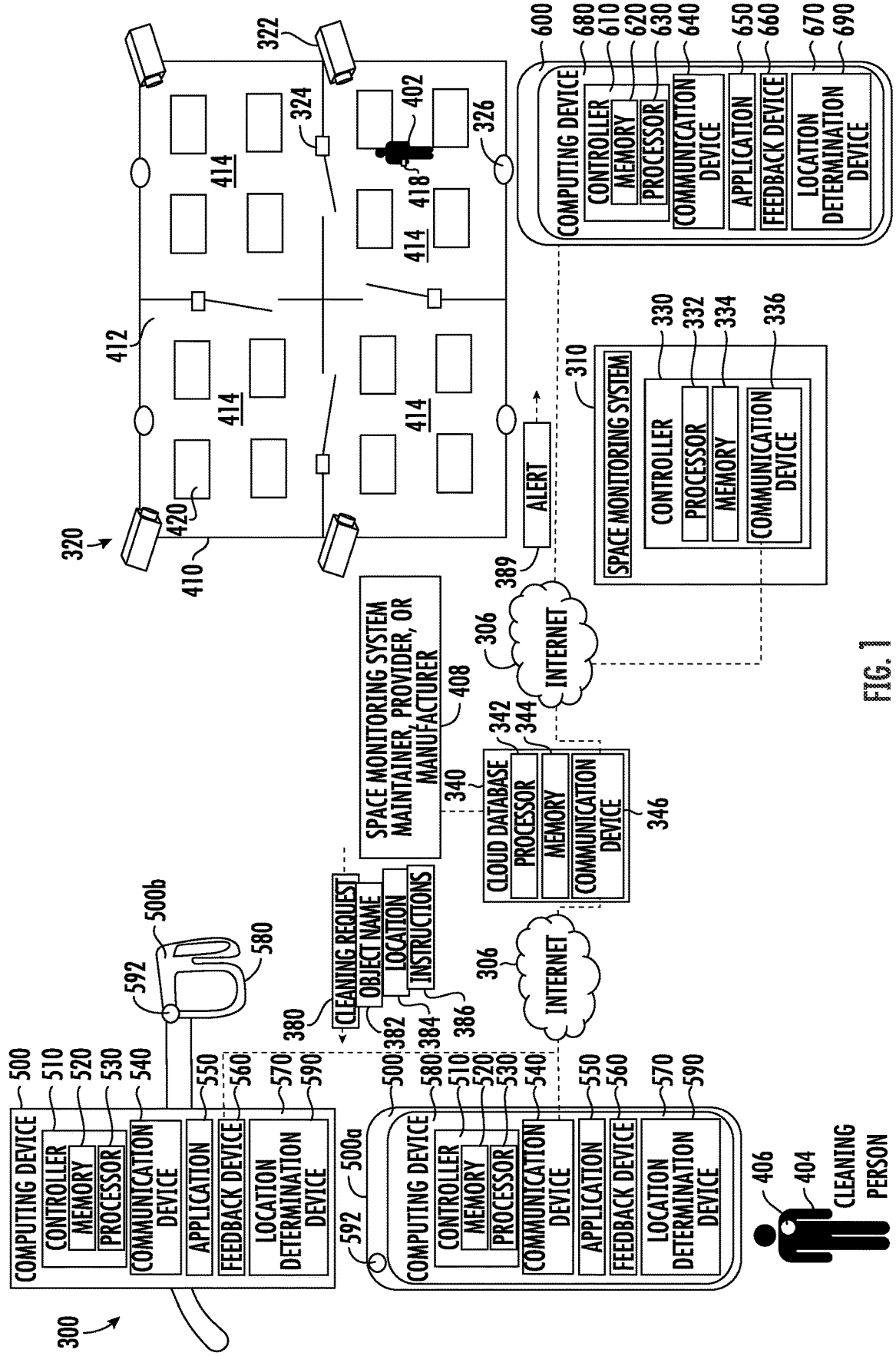

(51) Int. Cl.
*G06T 7/70* (2017.01)
*G06V 20/20* (2022.01)
*G06V 40/10* (2022.01)
*G08B 21/18* (2006.01)

(52) U.S. Cl.
CPC ............. *G06V 40/10* (2022.01); *G08B 21/18* (2013.01); *G06T 2207/30196* (2013.01); *G06T 2207/30232* (2013.01); *G06T 2207/30242* (2013.01)

(56) References Cited

U.S. PATENT DOCUMENTS

| | | | |
|---|---|---|---|
| 9,380,922 | B2 | 7/2016 | Duffley et al. |
| 9,679,464 | B2 | 6/2017 | Marra et al. |
| 10,156,833 | B2 | 12/2018 | Ray et al. |
| 10,303,843 | B2 | 5/2019 | Bitran et al. |
| 10,599,115 | B2 | 3/2020 | Meyer et al. |
| 10,624,516 | B2 | 4/2020 | Cudzilo |
| 10,664,673 | B2 | 5/2020 | Schenk et al. |
| 10,741,278 | B2 | 8/2020 | Sperry et al. |
| 10,978,199 | B2 | 4/2021 | Boisvert et al. |
| 11,184,739 | B1 | 11/2021 | Wellig et al. |
| 2009/0276239 | A1* | 11/2009 | Swart ............... G06Q 10/06375 705/2 |
| 2013/0088578 | A1* | 4/2013 | Umezawa ........... G06V 20/588 348/47 |
| 2016/0125723 | A1* | 5/2016 | Marra ................. G08B 21/245 340/573.1 |
| 2017/0039339 | A1* | 2/2017 | Bitran .................. G16H 50/30 |
| 2017/0172398 | A1* | 6/2017 | Carlson ................ A61B 90/361 |
| 2020/0336544 | A1 | 10/2020 | Bassett et al. |
| 2021/0076892 | A1 | 3/2021 | Schriesheim et al. |
| 2021/0283773 | A1 | 9/2021 | Ahn et al. |
| 2021/0299296 | A1* | 9/2021 | Xie ........................... A61L 9/14 |
| 2022/0053249 | A1* | 2/2022 | Lindstrom ............... H04Q 9/00 |

OTHER PUBLICATIONS

Author Unknown; "CleanGuru Janitorial Software" App Store Preview; 2021; 2 Pages. https://apps.apple.com/us/app/cleanguru-janitorial-software/id673270069.

Author Unknown; "The Janitor Cart" App Store Preview; 2023; 3 Pages. https://apps.apple.com/us/app/the-janitor-cart/id1371047831.

Author Unknown; "Top 9 Most Useful Housekeeping Apps of 2023"; SafetyCulture; May 20, 2019; Updated Feb. 15, 2023; 14 Pages. https://safetyculture.com/app/housekeeping/.

* cited by examiner

METHOD AND SYSTEM TO ANALYZE SPACES FOR CLEANING BASED ON THE PRESENCE OF AN INDIVIDUAL

CROSS-REFERENCE TO RELATED APPLICATIONS

This application claims the benefit of U.S. Provisional Application No. 63/320,376, filed Mar. 16, 2022, all of which are incorporated herein by reference in their entirety.

BACKGROUND

The embodiments herein generally relate to cleaning of objects and more specifically to a method and apparatus for monitoring a presence of individuals in proximity of an object to determine whether cleaning of said object is required.

Cleaning persons often spend countless hours cleaning entire spaces without knowing whether individuals were even present in certain locations of said space. Cleaning of spaces is often based on set schedules regardless of whether the space is being used.

BRIEF SUMMARY

According to one embodiment, a method for monitoring and controlling a cleanliness of a space is provided. The method including: monitoring a distance of one or more individuals relative to an object within the space using a space monitoring system; determining when the distance is less than a selected distance; determining a number of the one or more individuals within the selected distance of object; determining a duration that the one or more individuals are within the selected distance of the object; and determining that the object requires a cleaning when at least one of: the number of the one or more individuals within the selected distance of object exceeds a threshold number, or the duration that the one or more individuals are within the selected distance of the object exceeds a threshold time.

In addition to one or more of the features described above, or as an alternative, further embodiments may include generating a cleaning request.

In addition to one or more of the features described above, or as an alternative, further embodiments may include transmitting the cleaning request to a computing device of a cleaning person.

In addition to one or more of the features described above, or as an alternative, further embodiments may include that the cleaning request includes at least one of an object name of the object, a location of the object, or instructions detailing how to clean the object.

In addition to one or more of the features described above, or as an alternative, further embodiments may include that monitoring the distance of the one or more individuals relative to the object within the space using the space monitoring system further includes: detecting the distance of one or more individuals relative to the object within the space using a camera.

In addition to one or more of the features described above, or as an alternative, further embodiments may include that monitoring the distance of the one or more individuals relative to the object within the space using the space monitoring system further includes: detecting the distance of one or more individuals relative to the object within the space using a door access control device.

In addition to one or more of the features described above, or as an alternative, further embodiments may include that monitoring the distance of the one or more individuals relative to the object within the space using the space monitoring system further includes: detecting the distance of one or more individuals relative to the object within the space using a wireless signal tracking device.

In addition to one or more of the features described above, or as an alternative, further embodiments may include that the wireless signal tracking device is configured to detect an advertisement of a wearable tracking device worn by the one or more individuals or wireless connect to the wearable tracking device worn by the one or more individuals.

In addition to one or more of the features described above, or as an alternative, further embodiments may include providing the cleaning request to a cleaning person through a computing device.

In addition to one or more of the features described above, or as an alternative, further embodiments may include displaying the cleaning request for a cleaning person on a display device of the cleaner computing device.

In addition to one or more of the features described above, or as an alternative, further embodiments may include: capturing an image of the object on an augmented reality capable camera of the cleaner computing device; displaying the image of the object on a display device of the cleaner computing device while using the augmented reality capable camera; and identifying the object that requires the cleaning using augmented reality while using the augmented reality capable camera.

In addition to one or more of the features described above, or as an alternative, further embodiments may include that the cleaner computing device is a smart phone.

In addition to one or more of the features described above, or as an alternative, further embodiments may include that the cleaner computing device is a pair of smart glasses.

In addition to one or more of the features described above, or as an alternative, further embodiments may include monitoring the cleaning of the object performed by a cleaning person using a wearable camera.

In addition to one or more of the features described above, or as an alternative, further embodiments may include providing further cleaning instructions, a compliment, or a cleaning review based on the cleaning of the object performed by the cleaning person.

In addition to one or more of the features described above, or as an alternative, further embodiments may include monitoring a cleaning of the object performed by a cleaning person using an augmented reality capable camera of a pair of smart glasses.

In addition to one or more of the features described above, or as an alternative, further embodiments may include providing further cleaning instructions, a compliment, or a cleaning review based on the cleaning of the object performed by the cleaning person.

In addition to one or more of the features described above, or as an alternative, further embodiments may include transmitting an alert to a computing device for an individual to avoid the object in response to determining that the object requires the cleaning.

According to another embodiment, a space cleanliness analysis system for monitoring and controlling a cleanliness of a space is provided. The space cleanliness analysis system including: a processor; and a memory including computer-executable instructions that, when executed by the processor, cause the processor to perform operations, the operations including: monitoring a distance of one or more individuals relative to an object within the space using a space monitoring system; determining when the distance is less than a selected distance; determining a number of the one or more individuals within the selected distance of object; determining a duration that the one or more individuals are within the selected distance of the object; and generating that the object requires a cleaning when at least one of: the number of the one or more individuals within the selected distance of object exceeds a threshold number, or the duration that the one or more individuals are within the selected distance of the object exceeds a threshold time.

According to another embodiment, a computer program product tangibly embodied on a non-transitory computer readable medium, the computer program product including instructions that, when executed by a processor, cause the processor to perform operations including: monitoring a distance of one or more individuals relative to an object within the space using a space monitoring system; determining when the distance is less than a selected distance; determining a number of the one or more individuals within the selected distance of object; determining a duration that the one or more individuals are within the selected distance of the object; and generating that the object requires a cleaning when at least one of: the number of the one or more individuals within the selected distance of object exceeds a threshold number, or the duration that the one or more individuals are within the selected distance of the object exceeds a threshold time.

Technical effects of embodiments of the present disclosure include monitoring the relative location of individuals in relation to objects and their duration at said relative location to determine whether the object requires a cleaning.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

Figure 2:
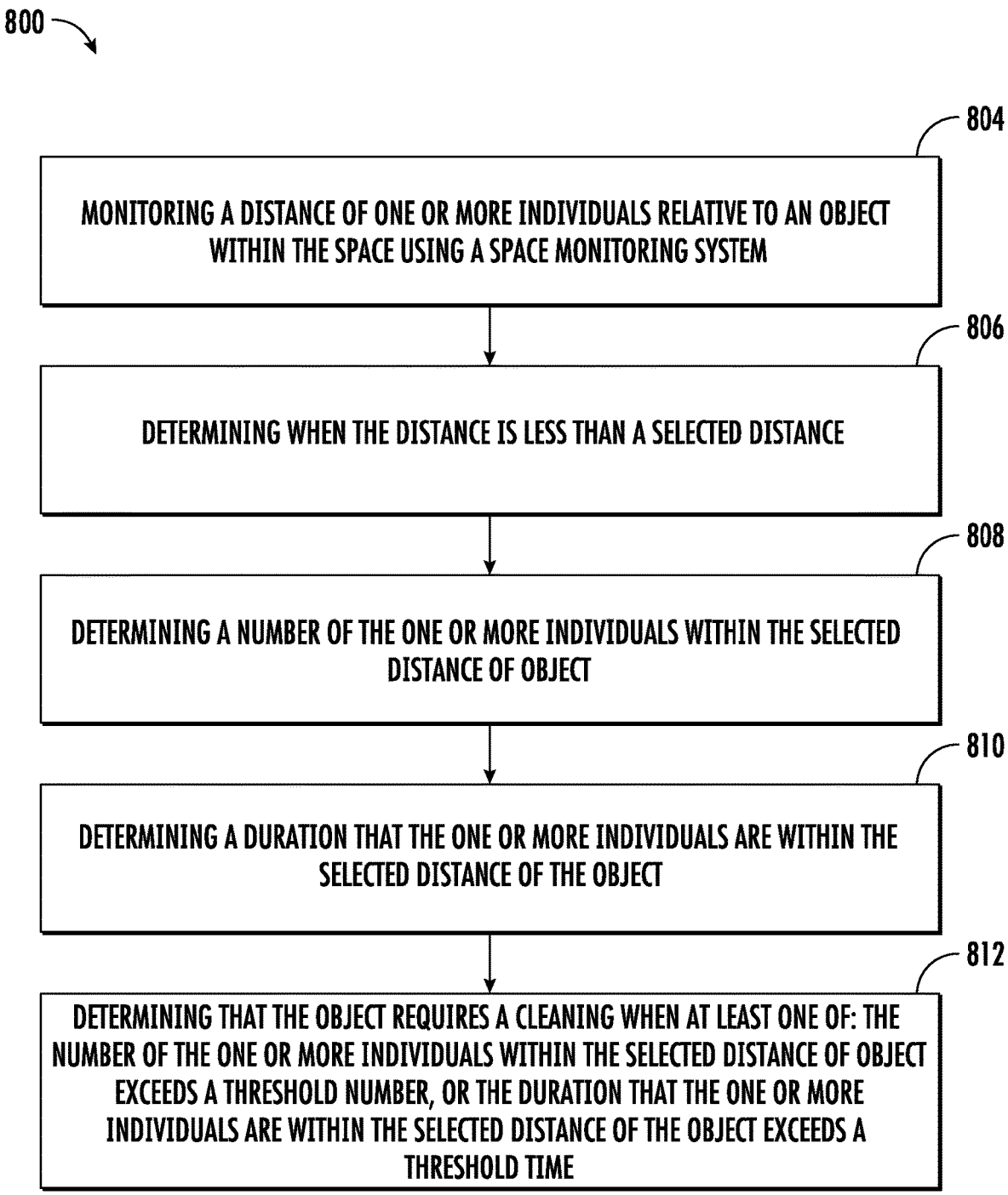

The following descriptions should not be considered limiting in any way. With reference to the accompanying drawings, like elements are numbered alike:

FIG. 1 is a block diagram of an exemplary space cleanliness analysis system, according to an embodiment of the present disclosure; and FIG. 2 is a flow diagram illustrating an exemplary method for monitoring and controlling a cleanliness of a space, according to an embodiment of the present disclosure.

DETAILED DESCRIPTION

A detailed description of one or more embodiments of the disclosed apparatus and method are presented herein by way of exemplification and not limitation with reference to the Figures.

Referring to FIG. 1 a schematic diagram of an exemplary space cleanliness analysis system 300 is illustrated, according to an embodiment of the present disclosure. It should be appreciated that, although particular systems are separately defined in the schematic block diagrams, each or any of the systems may be otherwise combined or separated via hardware and/or software.

The space cleanliness analysis system 300, as illustrated, may include the cloud database 340, a space monitoring system 310, and a computer application 550 installed or accessible on a cleaner computing device 500. The space monitoring system 310 includes one or more space monitoring devices 320 that may be distributed throughout an internal space 412 of a building 410. It is understood that while the following description associated figures describe an internal space 412 of a building 410, the embodiment disclosed herein may be applied to any space or area, including, but not limited to, external spaces.

The building 410 may be broken up into one or more rooms 414 and there may be at least one or more space monitoring devices 320 located within each of the rooms 414. The building 410 may be a home, an apartment, a business, an office building, a hotel, a sports facility, a garage, a room, a shed, a boat, a plane, a bus, elevator car interior, classrooms, libraries, university buildings, or any other structure known to one of skill in the art.

The space monitoring device 320 is configured to monitor the location of an individual 402 within the internal space 412 and/or a time period the individual 402 spends at the location. The space monitoring device 320 may be configured to differentiate one individual 402 from another to determine a number of individuals 402. The space monitoring device 320 may also be configured to monitor a location 384 of an object 420 within the internal space 412 and/or the location 384 of the object 420 may be saved to a memory 334. The space monitoring device 320 may also be configured to determine an object name 382 of the object 420 within the internal space 412 and/or the object name 382 of the object 420 may be saved to a memory 334. The space monitoring device 320 may be able to determine the location 384 of the object 420 and/or the object name 382 of the object 420 using machine learning that is performed by the space monitoring device 320, the space monitoring system 310, and/or the cloud database 340.

The space monitoring device 320 may include a camera 322, a door access control device 324, and/or a wireless signal tracking device 326.

The camera 322 may be configured to capture images of the individuals 402 located within the internal space 412. The camera 322 may be a video camera, fish-eye camera, or a thermal imagining camara. In one example, the fish-eye camera may be configured to analyze people density based on heat map and intersection analysis. In embodiment, the camera is configured to analyze people density and capture credentials of an individual 402 to determine who they are or what their role may be in the building 410 (e.g., janitor). The controller 330, using the camera 322, is configured to monitor a location of the individual 402 in the room 414 and how long the individual 402 spent at the location in the room 414. In one embodiment, the camera 322 may be configured to capture images of the objects 420 in order to determine a location of the individual 402 relative to the object 420. In another embodiment, the location of the objects 420 may be saved in the space monitoring system 310 and the location of the objects 420 does not need to be determined by the space monitoring device 320.

The door access control device 324 may be a badge reader operably connected to a door lock or turnstile lock. The controller 330, using the door access control device 324, is configured to monitor when the individual 402 enters the room 414, when the individual 402 leaves the room 414, and how long the individual 402 spent in the room 414.

The wireless signal tracking device 326 may be configured to track a location of the individual 402 throughout the internal space 412 using wireless triangulation, received signal strength indication (RSSI) and/or Time-of Flight wireless signal monitoring. The wireless signal tracking device 326 may wireless connect to or detect wireless advertisement from a wearable tracking device 418 that is worn by the individual 402. The wearable tracking device 418 may be a wearable user device, a wrist band, a mobile application, a smart watch, or any other similar device known to one of skill in the art. In order to detect or communicate with the wearable tracking device 418, the wireless signal tracking device 326 may utilize Bluetooth, Bluetooth Low Energy, Ultra-wideband, Zigbee, Near Field Communication (NFC), or any other similar communication method known to one of skill in the art. Likewise, the wearable tracking device 418 may utilize Bluetooth, Bluetooth Low Energy, Ultra-wideband, Zigbee, Near Field Communication (NFC), or any other similar communication method known to one of skill in the art. The controller 320, using the wireless signal tracking device 326, is configured to monitor a location of the individual 402 in the room 414 and how long the individual 402 spent at the location in the room 414.

The space monitoring system 310 includes a controller 330. The controller 330 for the space monitoring system 310 may be an internet of things (IoT) connected device.

The controller 330 is configured to communicate with the computer application 550 and the cloud database 340. The controller 330 may be configured to communicate with the computer application 550 through the cloud database 340. The controller 330 may be an electronic controller including a processor 332 and an associated memory 334 comprising computer-executable instructions (i.e., computer program product) that, when executed by the processor 332, cause the processor 332 to perform various operations. The processor 332 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 334 may be but is not limited to a random access memory (RAM), read only memory (ROM), or other electronic, optical, magnetic or any other computer readable medium.

The controller 330 also includes a communication device 336. The communication device 336 may be capable of wireless communication including but not limited to Wi-Fi, Bluetooth, Zigbee, Sub-GHz RF Channel, cellular, satellite, or any other wireless signal known to one of skill in the art. The communication device 336 may be configured to communicate with the cloud database 340 through the internet 306 using the communication device 336. The communication device 336 may be connected to the internet 306 through a Wi-Fi router or home automation system(not shown). Alternatively, or additionally, the communication device 336 may be configured to communicate directly with the cloud database 340.

The cloud database 340 may belong to and/or be managed by a space cleanliness monitoring system maintainer, provider, or manufacturer 408, such as, for example a manufacturer of the space monitoring system 310, a provider of the space monitoring system 310, a third-party service provider, or any service provider that may maintain the space monitoring system 310. The space cleanliness monitoring system maintainer, provider, or manufacturer 408 may be a person, an organization, a group, a partnership, a company, or a corporation.

In an alternate embodiment, the cloud database 340 may be distributed amongst multiple cloud databases rather than the single cloud database 340 that is illustrated in FIG. 1.

The cloud database 340 may be a remote computer server that includes a processor 342 and an associated memory 344 comprising computer-executable instructions (i.e., computer program product) that, when executed by the processor 342, cause the processor 342 to perform various operations. The processor 342 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 344 may be but is not limited to a random access memory (RAM), read only memory (ROM), or other electronic, optical, magnetic or any other computer readable medium.

The cloud database 340 also includes a communication device 346. The communication device 346 may be capable of communication with the internet 306. The communication device 346 may be configured to communicate with the cleaner computing device 500 through the internet 306. The communication device 346 may be a software module that handles communications to and from the computer application 550 or to and from the space monitoring system 310.

The cleaner computing device 500 may belong to or be in possession of a cleaning person 404. The cleaning person 404 may be a janitor of the building 410, a cleaner of the building 410, a maintenance person of the building 410, a building manager of the building 410, or any other individual that may be responsible for the cleanliness within the building 410.

The cleaner computing device 500 may be a desktop computer, a laptop computer, or a mobile computing device that is typically carried by a person, such as, for example a phone, a smart phone, a PDA, a smart watch, a tablet, a laptop, or any other mobile computing device known to one of skill in the art.

In an embodiment, the cleaner computing device 500 may be mobile device capable of augmented reality, such as, for example, a smart phone 500*a* or a pair of smart glasses 500*b*. The pair of smart glasses 500*b*, for example, may be designed in the shape of a pair of glasses with a lightweight wearable computer and a transparent display for handsfree work.

The cleaner computing device 500 includes a controller 510 configured to control operations of the cleaner computing device 500. The controller 510 may be an electronic controller including a processor 530 and an associated memory 520 comprising computer-executable instructions (i.e., computer program product) that, when executed by the processor 530, cause the processor 530 to perform various operations. The processor 530 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 520 may be but is not limited to a random access memory (RAM), read only memory (ROM), or other electronic, optical, magnetic or any other computer readable medium.

It is understood that the computer application 550 may be a mobile application installed on the cleaner computing device 500. The computer application 550 may be accessible from cleaner computing device 500, such as, for example, a software-as-as service or a website. The computer application 550 may be in communication with the cloud database 340 via the internet 306.

The cleaner computing device 500 includes a communication device 540 configured to communicate with the internet 306 through one or more wireless signals. The one or more wireless signals may include Wi-Fi, Bluetooth, Zigbee, Sub-GHz RF Channel, cellular, satellite, or any other wireless signal known to one of skill in the art. Alternatively, the cleaner computing device 500 may be connected to the internet 306 through a hardwired connection. The cleaner computing device 500 is configured to communicate with the cloud database 340 through the internet 306.

The cleaner computing device 500 may include a display device 580, such as for example a computer display, an LCD display, an LED display, an OLED display, a touchscreen of a smart phone, tablet, or any other similar display device known to one of the skill in the art. The cleaning person 404 operating the cleaner computing device 500 is able to view the computer application 550 through the display device 580. If the cleaner computing device 500 is a pair of smart glasses 500b, then the display device 580 may be a transparent lens of the pair of smart glasses 500b.

The cleaner computing device 500 includes an input device 570 configured to receive a manual input from a user (e.g., human being) of cleaner computing device 500. The input device 570 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the cleaner computing device 500, or any similar input device known to one of skill in the art. The user operating the cleaner computing device 500 is able to enter data into the computer application 550 through the input device 570. The input device 570 allows the user operating the cleaner computing device 500 to data into the computer application 550 via a manual input to input device 570. For example, the user may respond to a prompt on the display device 580 by entering a manual input via the input device 570. In one example, the manual input may be a touch on the touchscreen. In an embodiment, the display device 580 and the input device 570 may be combined into a single device, such as, for example, a touchscreen on the smart phone 500a.

The cleaner computing device 500 device may also include a feedback device 560. The feedback device 560 may activate in response to a manual input via the input device 570. The feedback device 560 may be a haptic feedback vibration device and/or a speaker emitting a sound. The feedback device 560 may activate to confirm that the manual input entered via the input device 570 was received via the computer application 550. For example, the feedback device 560 may activate by emitting an audible sound or vibrate the cleaner computing device 500 to confirm that the manual input entered via the input device 570 was received via the computer application 550.

The cleaner computing device 500 may also include a location determination device 590 that may be configured to determine a location of the cleaner computing device 500 using cellular signal triangulation, a global position satellite (GPS), or any location termination method known to one of skill in the art.

The cleaner computing device 500 may also include an augmented reality capable camera 592 configured to allow the computer application 550 capture live images to perform augmented reality operations.

In an embodiment, the camera 320 may be able to determine a role of the individual 402 and differentiate cleaning person 404 in the interior space 412 to clean (e.g., a cleaning role) versus individuals 402 whose presence may require further cleaning (e.g., a contamination role). The instructions 386 detailing how to clean the object 420 that are transmitted to the cleaning person 404 may depend on how may individuals 418 with a contamination role were in a particular location and for how long.

The space monitoring system 310 is configured to utilize the space monitoring devices 320 to monitor a location of an individual 402 relative to an object 420 in the internal space 412 and duration of that individual 402 in the location. Then a determination may be made whether the object 420 requires a cleaning following the individual 402 being at that location for greater than a specific period of time. The space monitoring system 310 and/or the cloud database 340 may make the determination that the object 420 requires a cleaning. The determination on whether a cleaning is required may also be dependent on a number of individuals 402.

The object 420 may be a table, desk, chair, seat, railing, handle, workstation, counter, doorknob, door handle, floor, carpet, rug, sink, light switch, touch surface, bar top, thermostat, computer, mobile device, conference room, cafeteria, coffee machine, vending machine, ATM, touch screen, office, or any other surface or area that may require cleaning after an individual being in that location for greater than a specific period of time.

Once the determination is made that an object 420 requires a cleaning then a cleaning request 380 may be transmitted to the cleaner computing device 500 so that it may be reviewed by the cleaning person 404 and then the cleaning person 404 may go clean the object 420. The cleaning request 380 may include an object name 382, a location 384 of the object 420, and instructions 386 detailing how to clean the object 420. The object name 382 may be a detailed description of the object 420, such as, for example workstation, desk, table, or counter. The location 384 of the object 420 may be a specific location of an object, such as, for example, a latitude, longitude, and height where the object 420 is located. Alternatively, the location 384 of the object 420 may be a general or rough location of the object 420, such as, for example, the object 420 is located on the third floor in room 414. The instructions 386 may be detailed instructions on what to use to clean the object 420 and how long to clean the object 420. The instructions 386 may vary based on how many individuals 402 were detected near the object 420 and for how long.

The cleaning person 404 may review the cleaning request 380 via the computer application 550 using the cleaner computing device 500. The computer application 550 is configured to display the cleaning request 380 via the display device 580 and/or provide audio instructions for the cleaning request 380 via a feedback device 560 (e.g., speakers). The object name 382, the location 384, and the instructions 386 may all be displayed on the display device 580 or provided through audio instructions via the feedback device 560.

The cleaner computing device 500 may convey the cleaning request 380 to the cleaning person 404 through augmented reality. For example, the cleaner computing device 500 may use the augmented reality capable camera 592 to capture live images of a space (e.g., the internal space 412) and display those live images on the display device 580 while displaying the object name 382, location 384, and/or instructions 386. The computer application 550 is configured to highlight or identify the objects 420 that require cleaning on the display device 580 using augmented reality while using the augmented reality capable camera 592. Advantageously, the use of augmented reality will allow the objects 420 that require cleaning to be highlighted or identified on the display device 580 so that the cleaning person 404 can easily and quickly identified what objects 420 to clean. The object 420 that require cleaning may be highlight using text, symbols, colors, or any combination thereof.

The smart phone 500*a* may also be connected to a wearable camera 406 worn by the cleaning person 404 that captures images of how the cleaning person 404 is cleaning the object 420, then the computer application 550 and/or the cloud database 340 can analyze the cleaning of the object 420 by the cleaning person 404 and provide further instructions as required. Alternatively, the augmented reality capable camera 592 may be configured to capture images of how the cleaning person 404 is cleaning the object 420, then the computer application 550 and/or the cloud database 340 can analyze the cleaning of the object 420 by the cleaning person 404 and provide further cleaning instructions, compliments, or cleaning review as required. In one example, the further cleaning instructions may state to further disinfect the object 420 or a spot was missed. In another example, the compliments or cleaning review may state that "the object was cleaned appropriately, well done!!".

Alternatively, the augmented reality capable camera 592 may be configured to capture images of the object 420 after the cleaning person 404 has cleaned it, then the computer application 550 and/or the cloud database 340 transmit an image to an owner of the object to give proof to the owner that the object 420 was properly cleaned.

A computing device 600 may belong to or be in possession of the individual 402. The individual 404 may be an employee of the building 410, a resident of the building 410, a visitor to the building 410, or any other individual that may be within the building 410.

The computing device 600 may be a desktop computer, a laptop computer, or a mobile computing device that is typically carried by a person, such as, for example a phone, a smart phone, a PDA, a smart watch, a tablet, a laptop, smart glasses, or any other mobile computing device known to one of skill in the art.

In an embodiment, the computing device 600 may be mobile device capable of augmented reality, such as, for example, a smart phone 600. The computing device 600 may be the wearable tracking device 418.

The computing device 600 includes a controller 610 configured to control operations of the computing device 600. The controller 610 may be an electronic controller including a processor 630 and an associated memory 620 comprising computer-executable instructions (i.e., computer program product) that, when executed by the processor 630, cause the processor 630 to perform various operations. The processor 630 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 620 may be but is not limited to a random access memory (RAM), read only memory (ROM), or other electronic, optical, magnetic or any other computer readable medium.

It is understood that the computer application 650 may be a mobile application installed on the computing device 600. The computer application 650 may be accessible from computing device 600, such as, for example, a software-as-as service or a website. The computer application 650 may be in communication with the cloud database 340 via the internet 306.

The computing device 600 includes a communication device 640 configured to communicate with the internet 306 through one or more wireless signals. The one or more wireless signals may include Wi-Fi, Bluetooth, Zigbee, Sub-GHz RF Channel, cellular, satellite, or any other wireless signal known to one of skill in the art. Alternatively, the computing device 600 may be connected to the internet 306 through a hardwired connection. The computing device 600 is configured to communicate with the cloud database 340 through the internet 306.

The computing device 600 may include a display device 680, such as for example a computer display, an LCD display, an LED display, an OLED display, a touchscreen of a smart phone, tablet, or any other similar display device known to one of the skill in the art. The cleaning person 404 operating the computing device 600 is able to view the computer application 650 through the display device 680. If the computing device 600 is a pair of smart glasses 600*b*, then the display device 680 may be a transparent lens of the pair of smart glasses 600*b*.

The computing device 600 includes an input device 670 configured to receive a manual input from a user (e.g., human being) of computing device 600. The input device 670 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the computing device 600, or any similar input device known to one of skill in the art. The user operating the computing device 600 is able to enter data into the computer application 650 through the input device 670. The input device 670 allows the user operating the computing device 600 to data into the computer application 650 via a manual input to input device 670. For example, the user may respond to a prompt on the display device 680 by entering a manual input via the input device 670. In one example, the manual input may be a touch on the touchscreen. In an embodiment, the display device 680 and the input device 670 may be combined into a single device, such as, for example, a touchscreen on the smart phone 600*a*.

The computing device 600 device may also include a feedback device 660. The feedback device 660 may activate in response to a manual input via the input device 670. The feedback device 660 may be a haptic feedback vibration device and/or a speaker emitting a sound. The feedback device 660 may activate to confirm that the manual input entered via the input device 670 was received via the computer application 650. For example, the feedback device 660 may activate by emitting an audible sound or vibrate the computing device 600 to confirm that the manual input entered via the input device 670 was received via the computer application 650.

The computing device 600 may also include a location determination device 690 that may be configured to determine a location of the computing device 600 using cellular signal triangulation, a global position satellite (GPS), or any location termination method known to one of skill in the art.

The cloud database 340 may be configured to transmit an alert 389 to the computing device 600 when the cleaning request 380 is determined. The alert 389 may instruct the individual 402 to avoid the object 420 if cleaning is required. For example, the object 420 may be a door and the door may become contaminated if too many people interact with it, so the alert 389 may instruct the individual 418 to utilize another door that is not contaminated.

Referring now to FIG. 2, with continued reference to FIG. 1, a flow diagram illustrating an exemplary computer implemented method 800 for monitoring and controlling a cleanliness of a space (e.g., internal space 412) is illustrated in accordance with an embodiment of the present disclosure. In embodiment, the method 800 is performed by the space cleanliness analysis system 300.

At block 804, a distance of one or more individuals 402 relative to an object 420 within the space is monitored using a space monitoring system 310. The distance of one or more individuals 402 relative to the object 420 within the space may be monitored by detecting the distance of one or more individuals 402 relative to the object 420 within the space using a camera 322, a door access control device 324, and/or a wireless signal tracking device 326. The wireless signal tracking device 326 may be configured to detect an advertisement of a wearable tracking device 418 worn by the one or more individuals 402 or wireless connect to the wearable tracking device 418 worn by the one or more individuals 402.

At block 806, it is determined when the distance is less than a selected distance. For example, the selected distance may be equal to zero meaning that the individual 402 is located at the object 420.

At block 808, a number of the one or more individuals 402 within the selected distance of object 420 is determined.

At block 810, a duration that the one or more individuals 402 are within the selected distance of the object 420 is determined.

At block 812, it may be determined that the object 420 requires a cleaning when at least one of: the number of the one or more individuals 402 within the selected distance of object 420 exceeds a threshold number, or the duration that the one or more individuals 402 are within the selected distance of the object 420 exceeds a threshold time. More individuals 402 may increase the likelihood that germs are spread on the object 420 and thus will require cleaning. The more time an individual 402 spends near the object 420 may increase the likelihood that germs are spread on the object 420 and thus will require cleaning.

The method 800 may include that a cleaning request 380 is generated. The method 800 may also include that the cleaning request 380 is transmitted to a computing device 500 of a cleaning person 404. The cleaning request 380 may include at least one of an object name 382 of the object 420, a location 384 of the object 420, or instructions 386 detailing how to clean the object 420. The cleaning request 380 may be provided to a cleaning person 404 through a computing device 500. The cleaning request 380 may be displayed for a cleaning person 404 on a display device 580 of a computing device 500.

The method 800 may further include an image of the object 420 is captured on an augmented reality capable camera 592 of the cleaner computing device 500 and then the image of the object 420 is displayed on a display device 580 of the cleaner computing device 500 while using the augmented reality capable camera 592. It may then be identified using augmented reality the object 420 that requires the cleaning while using the augmented reality capable camera 592. In an embodiment, the cleaner computing device 500 is a smart phone 500a. In another embodiment, the cleaner computing device 500 is a pair of smart glasses 500b.

The method 800 may further include that a cleaning of the object 420 performed by a cleaning person 404 is monitored using a wearable camera 406 or the augmented reality capable camera 592 of the pair of smart glasses 500b. Further cleaning instructions, a compliment, or a cleaning review based on the cleaning of the object 420 performed by the cleaning person 404 may be provided.

The method 800 may further include that an alert 389 is transmitted to a computing device 600 for an individual 402 to avoid the object 420 in response to determining that the object 420 requires the cleaning.

While the above description has described the flow process of FIG. 2 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodi-

What is claimed is:

1. A method for monitoring and controlling a cleanliness of a space, the method comprising:
monitoring a distance of one or more individuals relative to an object within the space using a space monitoring system;
determining when the distance is less than a selected distance;
determining a number of the one or more individuals within the selected distance of object;
determining a duration that the one or more individuals are within the selected distance of the object; and
determining that the object requires a cleaning when at least one of:
the number of the one or more individuals within the selected distance of object exceeds a threshold number, or
the duration that the one or more individuals are within the selected distance of the object exceeds a threshold time;
generating a cleaning request;
providing the cleaning request to a cleaning person through a cleaner computing device;
capturing an image of the object on an augmented reality capable camera of the cleaner computing device;
displaying the image of the object on a display device of the cleaner computing device while using the augmented reality capable camera; and
identifying the object that requires the cleaning using augmented reality while using the augmented reality capable camera.

2. The method of claim 1, further comprising:
transmitting the cleaning request to a computing device of a cleaning person.

3. The method of claim 2, wherein the cleaning request comprises at least one of an object name of the object, a location of the object, or instructions detailing how to clean the object.

4. The method of claim 1, wherein monitoring the distance of the one or more individuals relative to the object within the space using the space monitoring system further comprises:
detecting the distance of one or more individuals relative to the object within the space using a camera.

5. The method of claim 1, wherein monitoring the distance of the one or more individuals relative to the object within the space using the space monitoring system further comprises:
detecting the distance of one or more individuals relative to the object within the space using a door access control device.

6. The method of claim 1, wherein monitoring the distance of the one or more individuals relative to the object within the space using the space monitoring system further comprises:
detecting the distance of one or more individuals relative to the object within the space using a wireless signal tracking device.

7. The method of claim 6, wherein the wireless signal tracking device is configured to detect an advertisement of a wearable tracking device worn by the one or more individuals or wireless connect to the wearable tracking device worn by the one or more individuals.

8. The method of claim 1, further comprising:
displaying the cleaning request for a cleaning person on a display device of the cleaner computing device.

9. The method of claim 1, wherein the cleaner computing device is a smart phone.

10. The method of claim 1, wherein the cleaner computing device is a pair of smart glasses.

11. The method of claim 1, further comprising:
monitoring the cleaning of the object performed by a cleaning person using a wearable camera.

12. The method of claim 11, further comprising:
providing further cleaning instructions, a compliment, or a cleaning review based on the cleaning of the object performed by the cleaning person.

13. The method of claim 1, further comprising:
monitoring a cleaning of the object performed by a cleaning person using an augmented reality capable camera of a pair of smart glasses.

14. The method of claim 13, further comprising:
providing further cleaning instructions, a compliment, or a cleaning review based on the cleaning of the object performed by the cleaning person.

15. The method of claim 1, further comprising:
transmitting an alert to a computing device for an individual to avoid the object in response to determining that the object requires the cleaning.

16. A space cleanliness analysis system for monitoring and controlling a cleanliness of a space, the space cleanliness analysis system comprising:
a processor; and
a memory comprising computer-executable instructions that, when executed by the processor, cause the processor to perform operations, the operations comprising:
monitoring a distance of one or more individuals relative to an object within the space using a space monitoring system;
determining when the distance is less than a selected distance;
determining a number of the one or more individuals within the selected distance of object;
determining a duration that the one or more individuals are within the selected distance of the object; and
determining that the object requires a cleaning when at least one of:
the number of the one or more individuals within the selected distance of object exceeds a threshold number, or
the duration that the one or more individuals are within the selected distance of the object exceeds a threshold time;
generating a cleaning request;
providing the cleaning request to a cleaning person through a cleaner computing device;
capturing an image of the object on an augmented reality capable camera of the cleaner computing device;
displaying the image of the object on a display device of the cleaner computing device while using the augmented reality capable camera; and
identifying the object that requires the cleaning using augmented reality while using the augmented reality capable camera.

17. A computer program product tangibly embodied on a non-transitory computer readable medium, the computer program product including instructions that, when executed by a processor, cause the processor to perform operations comprising:

monitoring a distance of one or more individuals relative to an object within the space using a space monitoring system;
determining when the distance is less than a selected distance;
determining a number of the one or more individuals within the selected distance of object;
determining a duration that the one or more individuals are within the selected distance of the object; and
determining that the object requires a cleaning when at least one of:
  the number of the one or more individuals within the selected distance of object exceeds a threshold number, or
  the duration that the one or more individuals are within the selected distance of the object exceeds a threshold time;
generating a cleaning request;
providing the cleaning request to a cleaning person through a cleaner computing device;
capturing an image of the object on an augmented reality capable camera of the cleaner computing device;
displaying the image of the object on a display device of the cleaner computing device while using the augmented reality capable camera; and
identifying the object that requires the cleaning using augmented reality while using the augmented reality capable camera.

* * * * *